United States Patent [19]
Butler et al.

[11] Patent Number: 5,659,969
[45] Date of Patent: Aug. 26, 1997

[54] POSITION DETERMINING PROBE

[75] Inventors: Clive Butler, Kings Langley; Qingping Yang, Uxbridge, both of England

[73] Assignee: British Technology Group Limited, London, England

[21] Appl. No.: 185,935

[22] PCT Filed: Jul. 24, 1992

[86] PCT No.: PCT/GB92/01367

§ 371 Date: May 19, 1994

§ 102(e) Date: May 19, 1994

[87] PCT Pub. No.: WO93/02335

PCT Pub. Date: Feb. 4, 1993

[30] Foreign Application Priority Data

Jul. 24, 1991 [GB] United Kingdom ............ 9116044

[51] Int. Cl.⁶ ............................................ G01B 5/016
[52] U.S. Cl. ............................ 33/561; 33/559; 33/556
[58] Field of Search ................... 33/559, 561, 556, 33/558

[56] References Cited

U.S. PATENT DOCUMENTS

| | | |
|---|---|---|
| 4,158,768 | 6/1979 | Lavelli . |
| 4,694,184 | 9/1987 | Pryor .................................. 33/561 X |
| 4,942,671 | 7/1990 | Enderle et al. ..................... 33/561 X |
| 4,972,597 | 11/1990 | Kadosaki et al. ................... 33/556 |
| 5,103,572 | 4/1992 | Ricklefs ............................. 33/561 X |
| 5,222,304 | 6/1993 | Butler ................................ 33/558 X |

FOREIGN PATENT DOCUMENTS

| | | |
|---|---|---|
| 390648 | 10/1990 | European Pat. Off. . |
| 429378 | 5/1991 | European Pat. Off. . |
| 2365408 | 4/1978 | France . |
| 2238616 | 6/1991 | United Kingdom . |
| 90/00717 | 1/1990 | WIPO . |

OTHER PUBLICATIONS

Born, Max and Wolf, Emil, "Electromagnetic Theory of Propagation, Interference and Diffraction of Light," Principles of Optics, Sep. 22, 1975, pp. 434–449.

Primary Examiner—Thomas B. Will
Attorney, Agent, or Firm—Cushman, Darby & Cushman IP Group of Pillsbury Madison & Sutro LLP

[57] ABSTRACT

A probe for a position determining apparatus includes a sensing space and a movable stylus supported for three-dimensional position determining movement which extends into the space. A device emits sensing radiation into the space and a collector collects the sensing radiation from the space. A deflector is supported on the stylus within the space to deflect emitted sensing radiation and is movable with position determining movement of the stylus. The deflector concentrates the sensing radiation and the collector is sensitive to variations in the intensity distribution of collected deflected radiation which occur due to the three-dimensional movement of the stylus.

15 Claims, 7 Drawing Sheets

$$x_i = -l\sin\theta \cos(\varphi)$$
$$y_i = -l\sin\theta \cos(\varphi) \qquad (1)$$
$$z_i = l(1-\cos\theta) + \Delta z$$

$$\begin{bmatrix} X \\ Y \\ Z \end{bmatrix} = \begin{bmatrix} l_1 & m_1 & n_1 \\ l_2 & m_2 & n_2 \\ l_3 & m_3 & n_3 \end{bmatrix} (P_d - P_o) \qquad (2)$$

$$I(u,v) = \left(\frac{2}{u}\right)^2 \left[U_1^2(u,v) + U_2^2(u,v)\right] I_0 \qquad (3)$$

$$I(u,v) = \left(\frac{2}{u}\right)^2 \left[1 + V_0^2(u,v) + V_1^2(u,v) - 2V_0(u,v)\cos\left(\frac{u+\frac{v^2}{u}}{2}\right) - 2V_1(u,v)\sin\left(\frac{u+\frac{v^2}{u}}{2}\right)\right] \qquad (4)$$

$$u = \frac{2\pi}{\lambda}\left(\frac{a}{f}\right)^2 Z$$
$$v = \frac{2\pi}{\lambda}\left(\frac{a}{f}\right)\sqrt{X^2+Y^2}$$
$$U_n(u,v) = \sum_{s=0}^{\infty}(-1)^s \left(\frac{u}{v}\right)^{n+2s} J_{n+2s}(v) \qquad (5)$$
$$V_n(u,v) = \sum_{s=0}^{\infty}(-1)^s \left(\frac{v}{u}\right)^{n+2s} J_{n+2s}(v)$$

Fig. 13

POSITION DETERMINING PROBE

FIELD OF THE INVENTION

This invention relates to probes, such as are used with coordinate measuring, machine tools, robot and similar machines.

BACKGROUND OF THE INVENTION

In co-ordinate measuring machines, an object is measured by relative motion of a probe and an object in a controlled manner, usually from a datum, until a "touch" on the object is indicated by the probe or the probe is displaced by an indicated amount. The co-ordinates of the touch position are recorded or the probe indication combined with the machine indication. By repeated such actions the dimensions of the object can be determined. Appropriate actions are carried out with probes in machine tools, robot and similar machines.

UK Patent Application 8815984.3, published as GB-A-2220748, describes a touch probe for taking two dimensional measurements which can be mounted on a suitable kinematic mounting, to be movable to make measurements in the third dimension. However, the mounting is expensive and bulky.

The use of a cone of light emitted from a fibre optic and reflected by a plane mirror to an array of receiver fibre optics has been proposed (EP A 0429378—CNRS/CEMAGREF) for force measurement by the determination of the direction and amplitude of small lateral displacements of the mirror when the mirror is mounted to be responsive to an applied force, e.g. in an anemometer, by fluid flow or in a "joystick". In this arrangement only a part of the divergent cone of light is incident on the deflected mirror and the greater the defection the less light is so-incident. Furthermore the reflected light continues to diverge so that some of the already-reduced light misses the fibre receiver array while that reaching the array is of reduced intensity, due to the continued divergence.

Another form of three-dimensional probe for displacement indication is based on three small grating scales but this also is bulky, complex and expensive.

SUMMARY OF THE INVENTION

It is an object of this invention to provide a probe which overcomes such shortcomings and provides measurements in all three dimensions, According to the invention, there is provided a probe for a position determining apparatus and the like including a sensing space, a stylus supported for position determining movement and extending, means to emit into the space sensing radiation into the space and means to collect the sensing radiation from the space. The stylus in supported within the space means to deflect emitted sensing radiation upon movement of the deflecting means with position determining movement of the stylus. The stylus is supported for three-dimensional position determining movement, the deflection means concentrating the sensing radiation and the collection means being sensitive to a variation of intensity distribution of collected deflected radiation with the three-dimensional movement of the stylus, the stylus being free of mechanical connection for determining the position.

The sensing radiation may be one of light and like radiation, including visible light, infra-red light, ultra-violet light and other electromagnetic radiation.

The collection means for light radiation may include a fibre optic having an array of optical fibre elements. The collection means may include optoelectronic means responsive to deflected light intensity variation to produce a deflection-related signal and a signal processing arrangement to derive therefrom the movement of the deflection means and thereby determine the stylus movement in three dimensions. The optoelectronic means may be responsive to deflected light collected by the individual optical fibre elements.

The emission means for light radiation may be at least one optical fibre. The emission fibre may be one of the collection of fibre optic elements.

The deflection means may be one if a reflective and a refractive device for concentrating the deflected sensing radiation. When the radiation is light, the deflection means may be one of a lens, a mirror and a prism.

The probe can be arranged for analogue and/or touch operation.

The invention also provides a method of sensing three-dimensional movement of a stylus of a probe including mounting a refractive or focussing reflective element on the inward end of the stylus, directing focussed radiation at the element, collecting on a sensing arrangement focussed radiation refracted or reflected by the element, detecting changes of intensity distribution on the sensing arrangement with movement of the element and determining movement of the stylus from the detected changes of intensity distribution.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
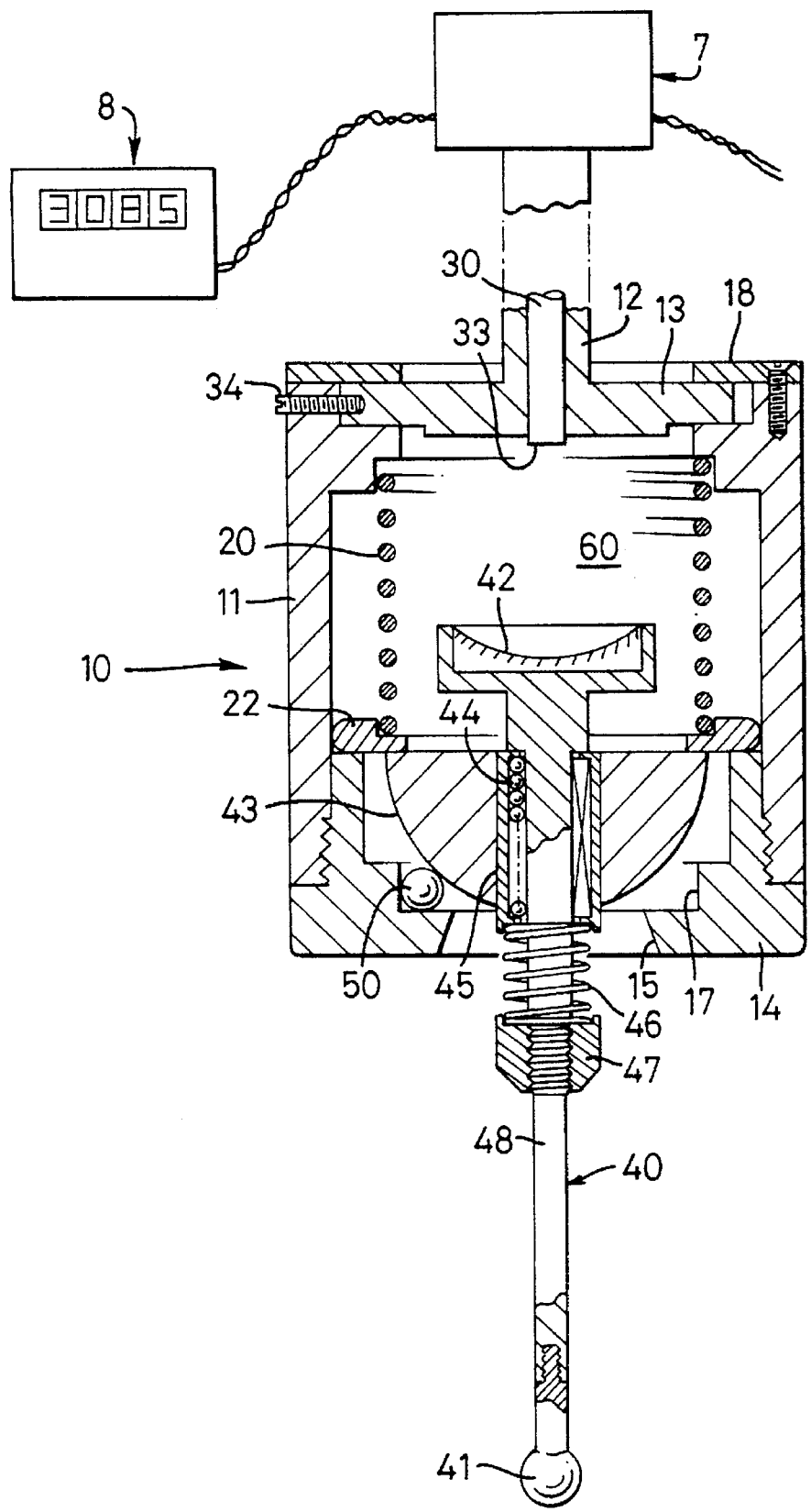
FIG. 1 shows in schematic cross-section a probe embodying the invention.

FIG. 1 shows a probe having a housing, indicated generally at 10, and including a body 11 threaded internally to receive a stylus carrier 14 and closed by cap 18 and cover 13, which has a mounting shank 12. Inside the housing is a sensing space 60. The stylus carrier 14 has an aperture 15 to allow for two dimensional (sideways) movement of a stylus 40. The stylus 40 passes through and is located on the carrier 14, conveniently by means of spring 20 acting through a follower 22 and housed at the other end in body 11.

Stylus 40 has at the inner end a mirror 42, which is preferably spherically concave. The mirror is on the inner end of stylus shaft 48. This shaft is housed in a part-spherical portion 43 of the stylus, which portion rests on a low-friction support conveniently formed by three balls, one only being shown at 50, seated in a ball seat 17 formed in stylus carrier 14. A seal for the aperture 15 may be provided if required.

In addition to the movement in two dimensions provided by the low-friction support, the probe arrangement according to the invention provides for movement in the third dimension, conveniently by permitting movement of stylus 40 along the longitudinal axis of shaft 48 in a bore 45 through portion 43. The bore is provided with a linear ball-bearing 44 to permit the movement in the third dimension as clearly errors due to sideways slackness must be minimized. A spring 46 acting between the housing of bearing 44 and an abutment 47 on stylus shaft 48 returns the stylus shaft after displacement to a reference position formed by the inner end of the ball-bearing 44. A stylus tip 41, for example a ruby of bali form, is screwed to the end of shaft 48. Other top forms may be used.

A fibre optic 30 is mounted on cover 13 through shank 12 and the end 33 of fibre optic 30 is exposed to mirror 42 in sensing space 60. Fibre optic 30 is centralised by three or four adjusting screws, one of which is shown at 34. Cover 13 has a smooth finish to ease movement and maintain consistent position during adjustment. A light source and light sensor connected to the other end of fibre optic 30 are indicated generally at 7 and a displacement display indicated generally at 8.

In the undeflected, neutral, position of the stylus the end 33 of the fibre optic is centered on the longitudinal neutral axis of the probe and concave mirror 42 is also centred on this axis. The longitudinal optic dimensions are considered below. The mirror concentrates light on the end 33 of the fibre optic in a range of different intensities. The spring 20 exemplifies means to constrain the stylus on to the low friction support and towards the longitudinal neutral claim is, permitting displacement on the support and returning the stylus towards the neutral axis after deflection. The spring urges follower 22 to an initial position in contact with portion 43 and carrier 14.

Approximate dimensions of one example of the probe, given by way of non-limiting example, are as follows, using the reference numerals of FIG. 1:

| | |
|---|---|
| portion 43 | 26 millimeter diameter |
| balls 50 | 3 millimeter diameter |
| axial movement, shaft 48 | 3 millimeters |
| overall length, shaft 48 | 60 millimeters. |

These dimensions indicate the overall size of this embodiment.

It is of course possible to make probes of smaller dimension which embody the invention. Other constructional details, suitable materials and shielding from stray light will be readily apparent to those skilled in the art. Suitable fibre optics include the HCN and HCP types made by Ensign-BicKford of Avon, Conn., USA. Typically fibres of one millimetre diameter can be used.

Figure 2:
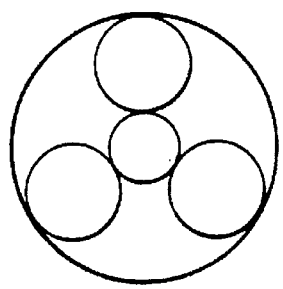
FIGS. 2 shows a fibre optic array for the probe of FIG. 1.
Figure 3:
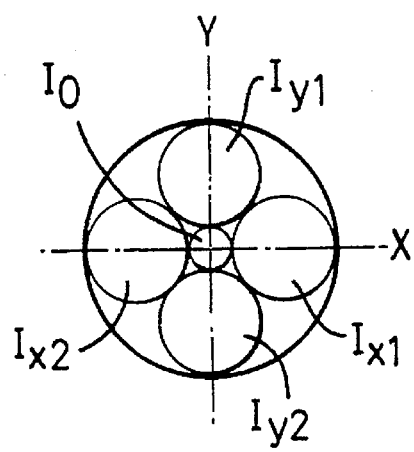
FIG. 3 shows a fibre optic array for the probe of FIG. 1.
Figure 4:
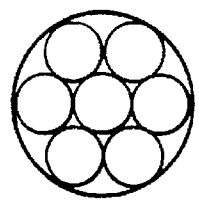
FIG. 4 shows a fibre optic array for the probe of FIG. 1.
Figure 5:
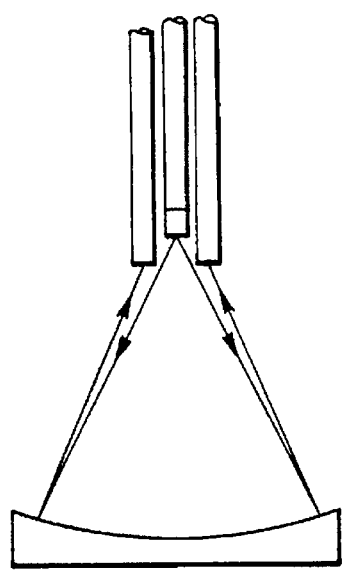
FIG. 5 shows a fibre optic array for the probe of FIG. 1.

The form of the fibre optic 30 is important in providing effective three-dimensional measurements. One suitable general arrangement, such as shown in FIGS. 2, 3, or 4, is a central fibre element to emit light surrounded by an array of fibre optic elements, that is several fibre elements in defined relation to receive light reflected from the mirror 42. FIGS. 2 to 6 show some forms for fibre optic 30 although others are possible. It is believed that at least three receiving fibre elements arranged in an array around the central fibre element, which may be a collecting and an emitting fibre, are needed to provide three-dimensional information. Conveniently a LED, for example in unit 7, supplies light to the emitting fibre. A wavelength of about 950 nanometres is suitable.

The mirror 42 has three degrees of freedom in the sensing volume 60 and as the orientation changes the reflected beam from the mirror changes the light intensity distribution on the detecting optic fibre element array. From these changes the lengthwise and sideways movements of the stylus shaft and tip must be deduced, for example from a look-up table. The movements of the mirror in this embodiment can be defined in spherical polar coordinates.

The action of the probe is as follows right from the emitting fibre element or elements at the fibre optic end 33 is directed along the above-mentioned undeflected longitudinal, neutral, axis towards the mirror 42 for incidence thereon. In the undeflected position of the stylus the light from fibre optic end 33 is reflected back to the receiving fibre elements in the fibre optic end 33 and returns along the fibre optic to a signal processing arrangement, contained conveniently in units 7 and 8. As the stylus is deflected the light reflected by the mirror is moved over fibre optic end 33. The pattern and amount of reflected light returning along the fibre optic is varied. By suitable techniques well-known in the art, such as beam-splitting, the light reflected from the mirror can be compared with the light incident thereon in suitable optoelectronic means or like comparator or measured absolutely and displayed at 80. For example an analyst is based on a system of non-linear equations with the mirror position, which is defined by the stylus position, as unknown is suitable. When the cause of deflection is removed the constraining means, such as spring 20 and spring 46, restores the stylus towards the undeflected position.

From the description set out above it will be apparent that the probe embodying the invention is of much simpler construction than those known thereto and the sensing of the occurrence of stylus displacement does not rely on electro-mechanical switching. Further the sensing action can detect all three directions of stylus deflection.

However, various further advantages are also provided by the invention as will now be detailed.

The arrangement can work in analogue or trigger mode. In the latter a change in reflected light is only significant when a charge above a predetermined level has occurred. This gives an arrangement compatible with existing coordinate measuring machines.

It is advantageous not to have the optical fibre array at the focus of the mirror when in its initial, neutral position. There is an improvement in longitudinal sensible by such a slightly defocussed arrangement. The light emerging from the fibre optic may be conveyed along one or more of the collecting elements.

In use as the mirror moves around the light density on each receiving and detecting fibre varies. Generally the light output from each fibre is described by a nonlinear function of the input position parameters (x, y, z) which are unknown and need to be found. Thus an array of fibres gives rise to a set of nonlinear equations. In theory three fibres provide enough information. Five receiving fibres have been used (FIG. 3) and this permits an efficient least squares solution, the effects of noise which is always present in practice. Other fibre arrays, e.g. seven fibres (FIG. 4), are possible. Fibre arrays laid out to reduce the computation required are also possible, for example reducing the need for non-linear equations. Tests using five fibres (FIG. 3) have given resolution of 0.1 micrometre in the x and y axes with a depth resolution of one micrometre. Comparison with a typical commercial probe shows that a probe embodying the invention has total error half that of the typical probe for stylus lengths of fifty to eighty millimetres.

Figure 7:
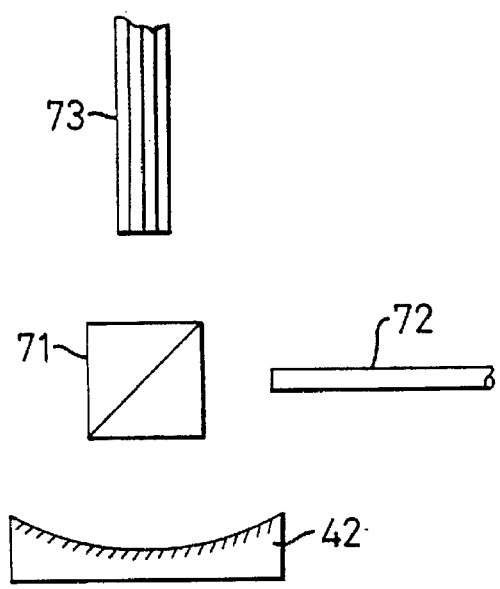
FIG. 7 shows an optical arrangement for a probe sensor.

FIG. 7 shows an optical arrangement in which a beam splitter 71 directs light from an emitter fibre 72 to a mirror 42. Light reflected from mirror 42 passes through beam splitter 71 to collector fibre optic 73.

Figure 8:
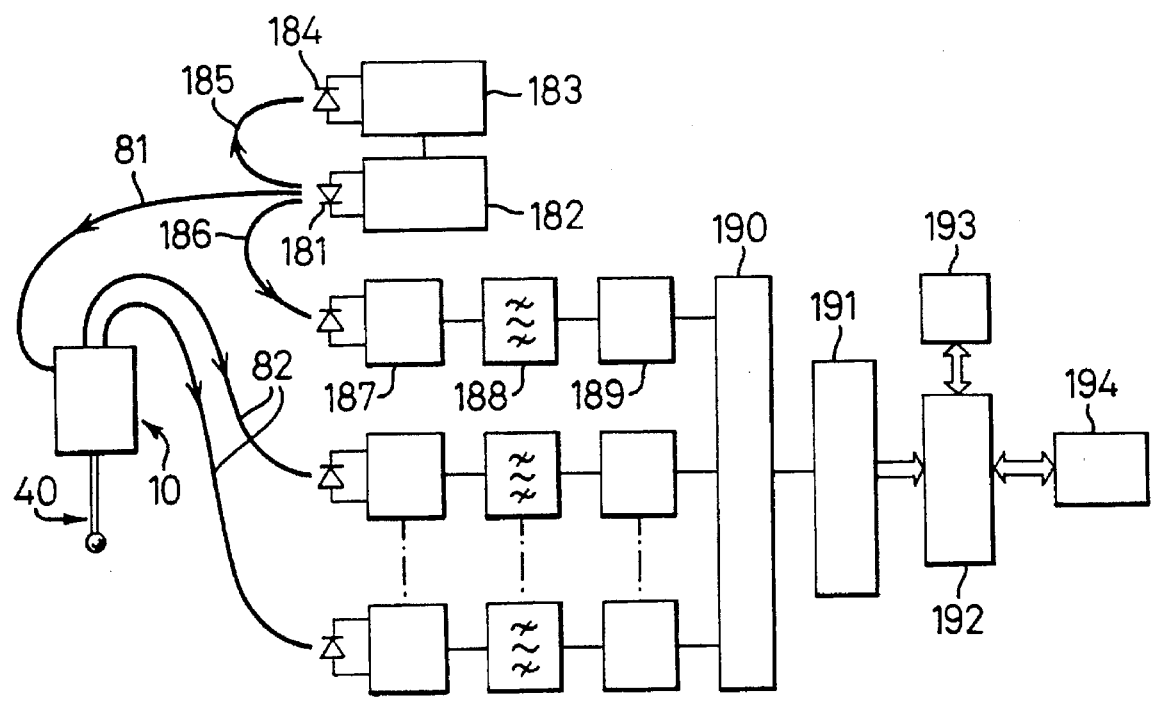
FIG. 8 shows a schematic diagram of a probe sensor.

FIG. 8 shows a schematic diagram of a probe sensor circuit. An emitter fibre optic 81 and a collector fibre optic 82 are connected to probe 10 having a stylus 40. The emitter fibre optic is supplied by an LED 181 energised by a driver 102 controlled by a feedback device 183 and a photodiode 184 connected by fibre optic 185 to LED 181 in a stabilized circuit with optical feedback. A further fibre optic 186 connects LED 181 to a reference channel of a photodiode and amplifier 187, a band pass filter 188 and a sample and hold device 189. The reference channel is used to compensate for drift in the receiver now described. Each fibre of the collector optic 82 has a receiver channel arrangement similar to the reference channel of a photodiode and amplifier, band pass filter and sample and hold device. The output of the reference channel and each fibre channel are connected to a multiplexer 190 and an ADC (analog-to-digital converter) 191. The ADC 191 has a resolution of 14 bits with a conversion time of less than 10 microseconds. A single-chip microprocessor 192 can operate the sensor circuit and appropriate display 193. Alternatively a personal computer 194 can be arranged for the purpose.

In a modification of the circuit in FIG. 8 offset and gain controls are provided in loops around the multiplexer 190 and the microprocessor 192. A buffer is introduced between the multiplexer 190 and the ADC 191 so that control signals can be applied in the circuit. The microprocessor also provides an output for the sample and hold devices.

Since the three dimension measurement generates a large amount of data, the modelling of the sensor plays a key role in analyzing the sensor performance and leads to optical the design.

Figure 9:
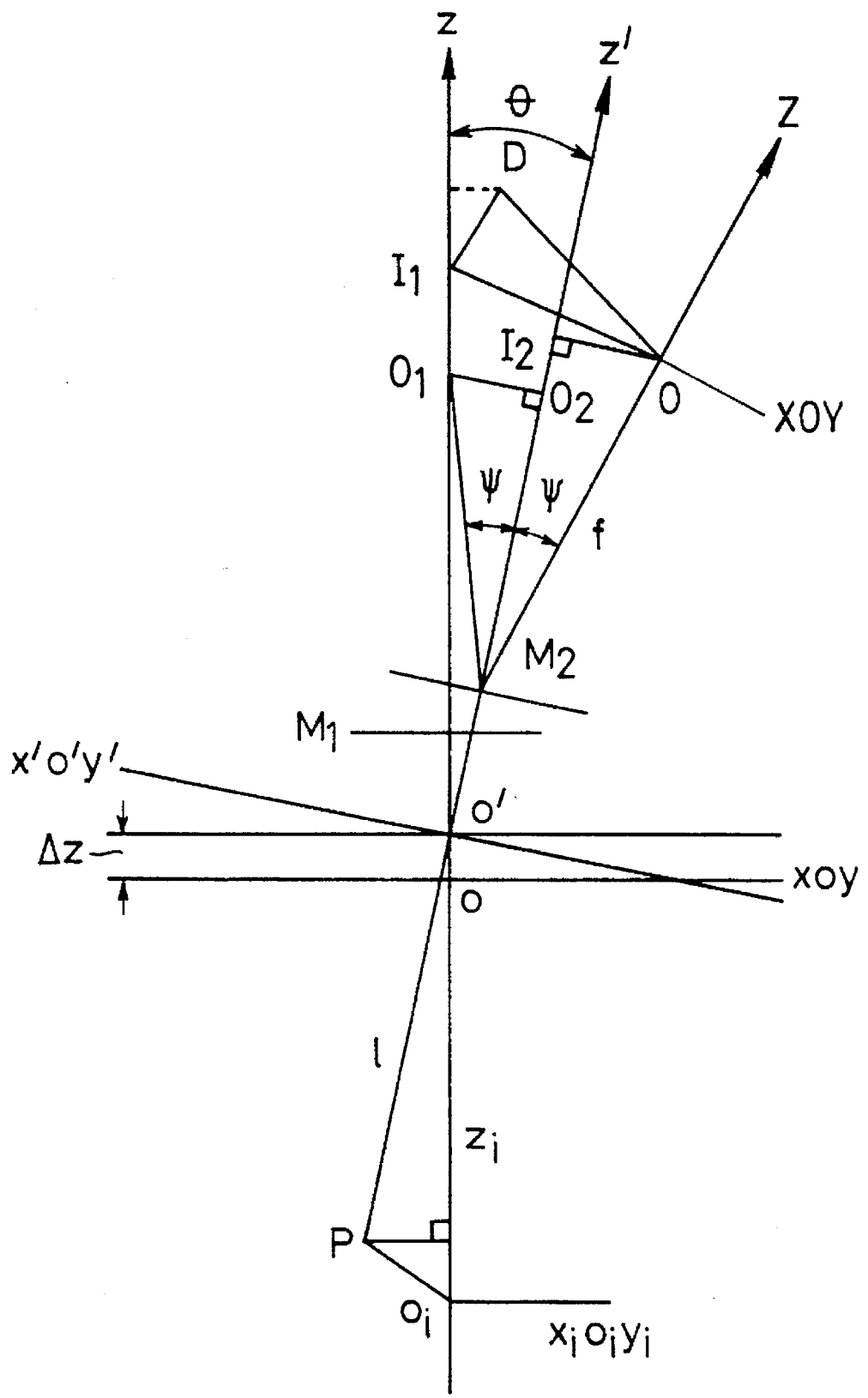
FIG. 9 is a diagram of the relationship between sensed values and positioned coordinates upon movement of a mirror from position M1 to M2.

The sensor model is described by way of example by the equations (1)–(5) shown in FIG. 13 and using the references of FIG. 9 and the fibre optic arrangement and nomenclature of FIG. 3.

In equation 1 Z is the stylus length as shown in FIG. 9, where Zi shows the initial position of the stylus connected to mirror 42 located at position M1 and P shows the displacement of the tip of the stylus with light 1 connected to the mirror 42 located at position M2. In FIG. 9, D represents the deflection of the stylus from the initial position in three dimensional space.

$(x_i, y_i, z_i)$ is the position of stylus tip in the object coordinate system (OCS) defined in FIG. 1, $(\theta, \psi, \Delta z)$ is defined in the sensor coordinates system (SCS). $\theta$, the latitude, $\psi$, the longitude, $\Delta z$, the displacement along z axis.

In equation 2 (X,Y,Z) is the position of the detectors relative to the centre of the image plane. It varies with $(x_i, y_i, z_i)$.

$(z_1, m_1, n_1)$, $(z_2, m_2, n_2)$ are the direction cosines of OX, OY, OZ in the sensor coordinate system (SCS), respectively. They are functions of $(\theta, \psi, \Delta z)$.

$P_d = (x, y, z)^T$ is the position of the detectors in SCS.

$P_o = (x_o, y, z_o)^T$ is the position of the image point in SCS. It is also a function of $(\theta, \psi, \Delta z)$.

Equations 3 and 4 deal with light intensity, and equation 5 defines $u, v, U_n$ and $V_n$ while:

I is the intensity at the detector position, (X,Y,Z);

$I_0$ is the intensity at the centre of the image plane;

f is the distance from the mirror centre to the centre of the image plane;

$\lambda$ is the light wavelength.

Figure 10A:
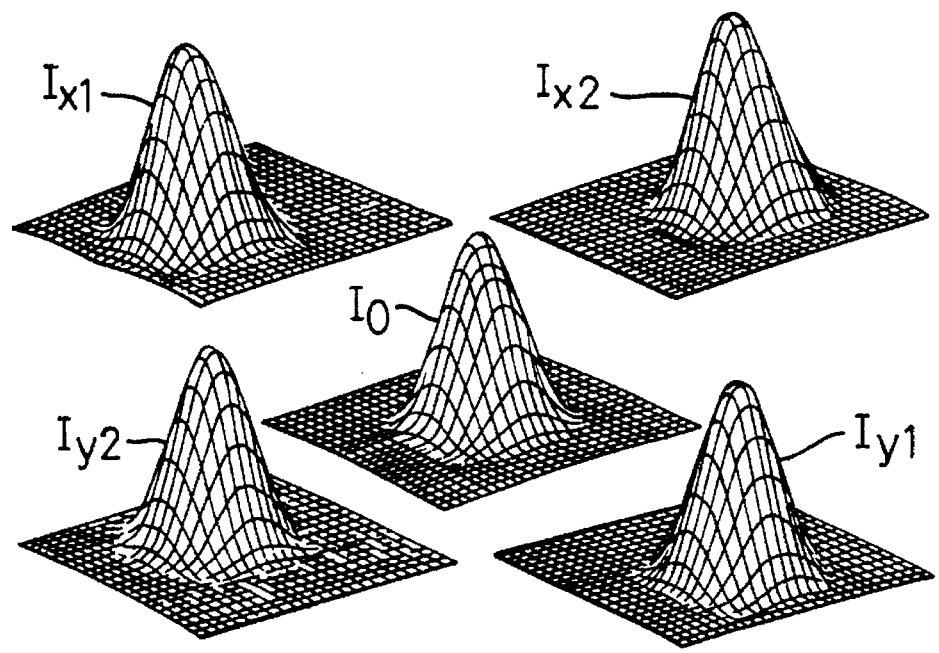
FIG. 10a is a graph of sensed value when the stylus is in a rest position.
Figure 10B:
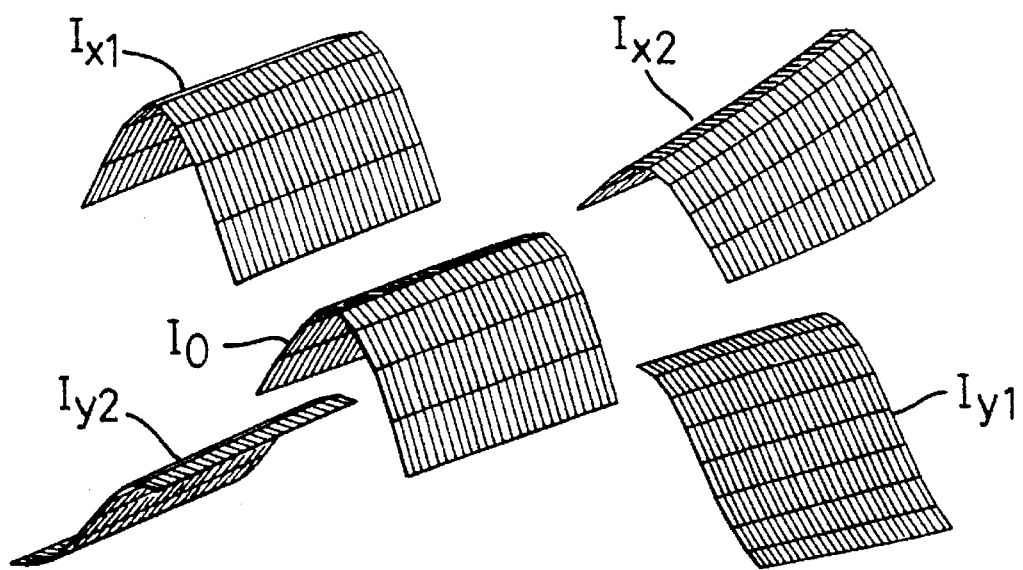
FIG. 10b is a graph of sensed value after the stylus has been moved from its rest position.
Figure 11:
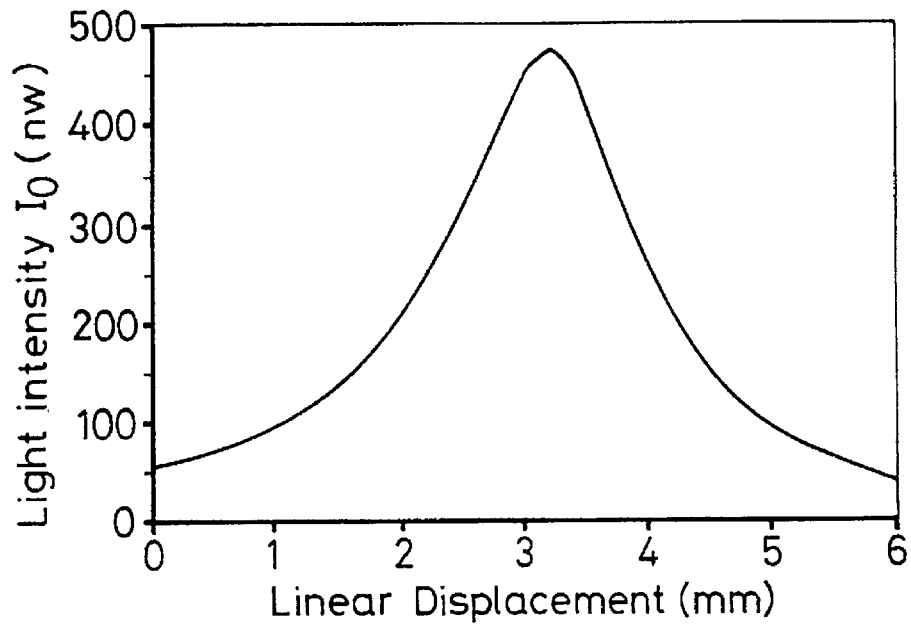
FIG. 11 is a graph of light intensity vs. linear displacement.
Figure 12:
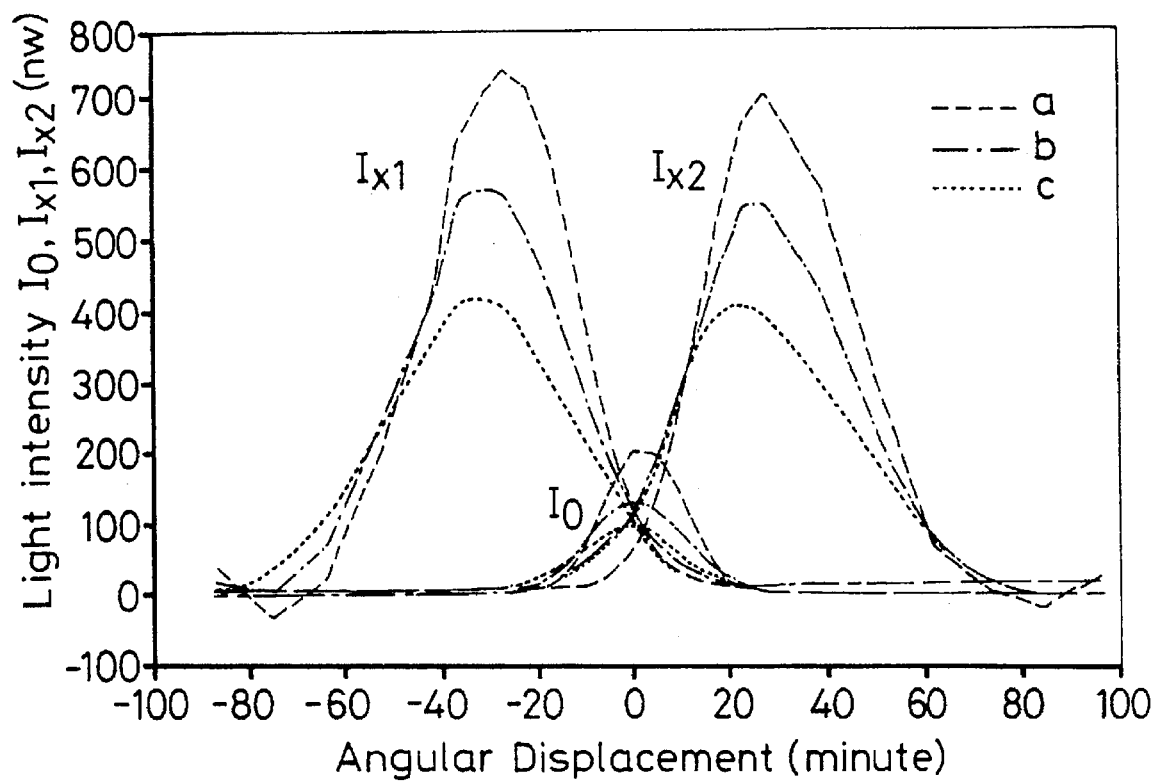
FIG. 12 is a graph of light intensity vs. angular displacement, and FIG. 13 contains equations for use with a preferred embodiment of this invention.

Given the input position $(x_i, y_i, z_i)$, the light intensity detected by the fibres array $(I_1, I_{x2}, I_{y1}, I_{y2}, I_0)$ (FIG. 3) can be determined from the above sensor model. The typical light intensity distributions $(I_{x1}, I_{x2}, I_{y1}, I_{y2}, I_0)$ in one horizontal plane, defined as an x-y plane, and in one x-z plane are shown in FIGS. 10a and 10b respectively.

Using the sensor model, and a non-linear least square minimization method, the relationship between $(x_1, y_1, z_1)$, and $(I_{x1}, I_{x2}, I_{y1}, I_{y2}, I_o)$ can be approximated by five non-linear equations. The well-known iterative Gaussian-Newton method was used to solve the non-linear equations. Alternatively, a look-up table (LUT) or the combination of the empirical formulae and LUT could be used, the latter is easier to implement with a microprocessor. The analyses have indicated the existence of a unique solution in the small position measurement volume ($\leq 1.5$ mm cube) in the presence of a certain defined noise level.

Tests in accordance with the method recommended by the UK National Physical Laboratory for analogue probes, including statistical analysis of the results, shows repeatability and absolute accuracy of better than one micrometre is uniformly achieved in a calibrated test volume of 200×200×200 micrometres. Drift is less than one micrometre in four hours.

Figure 6:
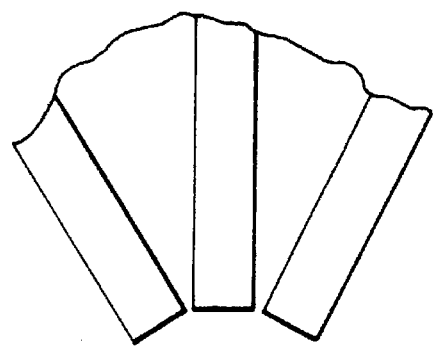
FIG. 6 shows a fibre optic array for the probe of FIG. 1.

Depth sensitivity can be improved with non-coplanar fibre ends (FIG. 5) or inclined fibre ends (FIG. 6).

An opaque disc at the centre of the mirror and/or at the emitter fibre improves depth sensitive. Beam splitters can be used to alter the arrangement of the light paths. An array of three or more charge coupled device strips can be used instead of the fibres, with some loss of depth resolution as the number of grey levels is limited for many digital devices. Another alternative is the use of analog position sensitive detector devices (PSD) in a suitable array arrangement. More than one wavelength of radiation may be used while the emitted light may be modulated in intensity, both measures being relevant to noise reduction.

Other arrangements in accordance with the above techniques will be apparent to those skilled in the art, for example rearranging the linear bearing and the tilting bearing, Also movements in only any two of the three dimensions may be determined. Light, which includes infra red and ultra violet radiation, may be used as the deflection sensing medium, infra red being used in the specific embodiments described above. Clearly microwave or other electromagnetic radiation can be used with appropriate radiation sources in the housing and deflector devices on the stylus. Other arrangements of radiation source are possible, for example in the lower part of the sensing space to direct radiation through a deflector on the stylus.

We claim:

1. A probe for a position determining apparatus, comprising:

a body having a sensing space;

a ball rocker disposed within said body, said ball rocker having an aperture extending therethrough in a first direction;

a stylus supported for position determining movement by said ball rocker and extending into said space, said stylus being disposed in said aperture in said ball rocker and being movable relative to said ball rocker through said aperture in said first direction;

deflection means for deflecting radiation disposed in said space on an end of said stylus;

emission means for emitting sensing radiation into said space to be deflected by said deflection means; and collection means for collecting sensing radiation deflected by said deflection means.

2. A probe according to claim 1 in which the sensing radiation is one of visible light, infra-red light and ultraviolet light.

3. A probe according to claim 1, in which said collection means includes a fibre optic having an array of individual optical fibre elements.

4. A probe according to claim 1, in which the emission means is at least one optical fibre.

5. A probe according to claim 3, in which said emission means is one of said optical fibre elements.

6. A probe according to claim 1 in which the sensing radiation is light and the collection means includes optoelectronic means responsive to deflected light intensity variation to produce a deflection-related signal and a signal processing arrangement to derive therefrom the movement of the deflection means and thereby determine the stylus movement in three dimensions.

7. A probe according to claim 6, in which the collection means for light radiation includes a fibre optic having an array of individual optical fibre elements and in which the optoelectronic means is responsive to deflected light collected by said individual optical fibre elements.

8. A probe according to claim 1 in which the deflection means is one of a reflective and a refractive device for concentrating said deflected sensing radiation.

9. A probe according to claim 1 in which the deflection means is arranged to focus radiation and is supported to focus radiation to other than the collection means at the neutral position of the stylus.

10. A probe according to claim 1 including means responsive to an output of the collection means representing collected deflected radiation intensity variation to derive from variation of said output by least squares technique movement of the deflection means and thereby determine stylus movement in three dimensions.

11. A probe according to claim 1 in which the stylus movement is arranged to have a deflection means movement volume containing unique deflection means position solutions for a selected noise level.

12. The probe of claim 1, wherein said stylus is supported within said space to deflect said sensing radiation upon movement of the deflection means with position determining movement of the stylus.

13. The probe of claim 1, wherein said stylus is supported for three-dimensional position determining movement.

14. The probe of claim 13, wherein said deflection means concentrates said sensing radiation and said collection means is sensitive to a variation of intensity distribution of collected deflected radiation upon three-dimensional movement of the stylus.

15. The probe of claim 1, further comprising a spring disposed along said stylus for biasing said stylus within said aperture of said ball rocker toward a neutral position.

* * * * *